(No Model.) 2 Sheets—Sheet 1.
T. S. WHITWORTH.
CARDING ENGINE.
No. 468,854. Patented Feb. 16, 1892.
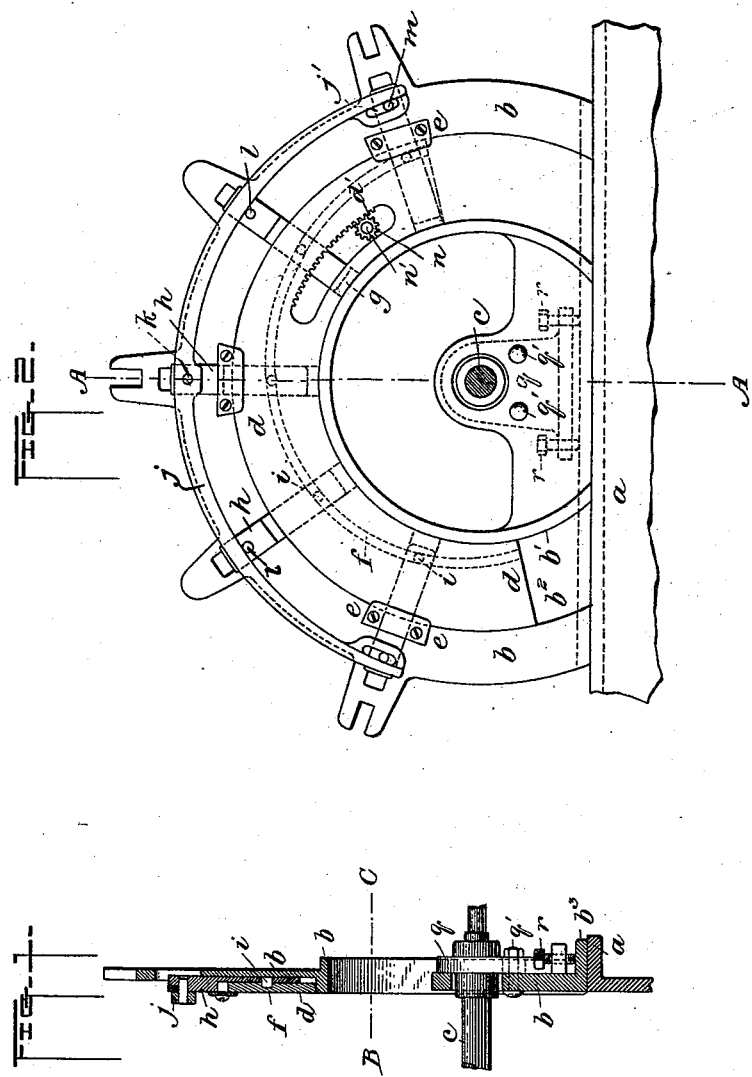
Witnesses
H. P. Barlow
Herbert R. Abbey
Inventor
Thomas S. Whitworth (No Model.) 2 Sheets—Sheet 2.
T. S. WHITWORTH.
CARDING ENGINE.
No. 468,854. Patented Feb. 16, 1892.
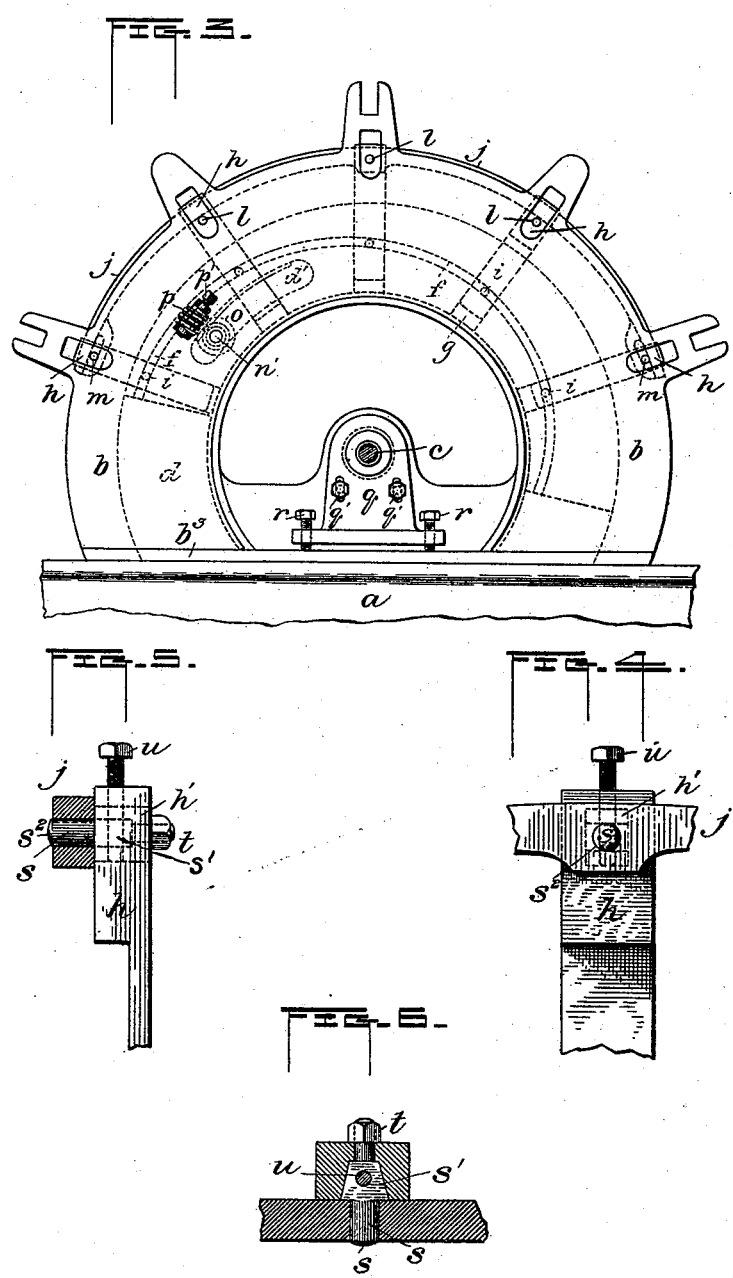
Witnesses
H. B. Barlow
Herbert R. Abbey
Inventor
Thomas S. Whitworth

UNITED STATES PATENT OFFICE.

THOMAS S. WHITWORTH, OF MANCHESTER, ENGLAND, ASSIGNOR TO THE LOWELL MACHINE SHOP, OF LOWELL, MASSACHUSETTS.

CARDING-ENGINE.

SPECIFICATION forming part of Letters Patent No. 468,854, dated February 16, 1892.

Application filed July 10, 1891. Serial No. 399,055. (No model.) Patented in England August 30, 1889, No. 13,685.

*To all whom it may concern:*

Be it known that I, THOMAS SCHOFIELD WHITWORTH, of Manchester, county of Lancaster, England, have invented certain new and useful Improvements in Carding-Engines for Carding Cotton, Wool, and other Fibrous Materials, (for which I have secured Letters Patent in Great Britain, No. 13,685, dated August 30, 1889,) of which the following is a specification.

My invention relates to carding-engines having traveling flats and used for carding cotton, wool, and other fibrous materials, and in particular to that part of a carding-engine which is used, in conjunction with the traveling flats, for sustaining and guiding the flats in proper working position as they pass around part of the circumference of the main cylinder.

My invention consists in an improved construction and combination of parts for supporting and adjusting the flexible bend of a traveling-flat carding-engine, whereby I am enabled to mount and adjust the said flexible bend of the carding-engine in proper position to support and guide the traveling flats, so as to place the card-surfaces thereof in proper working relations with the card-surface of the main cylinder.

My invention will first be described with reference to the drawings, and then will be particularly pointed out in the claims at the close of this specification.

In the accompanying drawings, Figure 1 is a view in section on line A A of Fig. 2 of part of a carding-engine having my invention applied thereto. Fig. 2 is a view of parts shown in Fig. 1 in side elevation, looking in the direction from B to C in the said figure. Fig. 3 is a similar view showing the parts as seen when looking in the direction from C to B in Fig. 1. Figs. 4, 5, and 6 are views of details.

The same letters of reference are applied to corresponding parts throughout all the figures.

The side framing of a carding-engine is shown at $a$, and $b$ is a fixed bend upon which is formed a surface $b'$ concentric with the axis $c$ of the main cylinder. Upon the surface $b'$ and capable of being moved circumferentially thereon is placed a plate or sector $d$, a curved recess $b^2$ being formed in the bend $b$ to receive the plate or sector $d$, and the latter being retained in the recess by means of plates $e$, secured to the bend $b$. In the plate or sector $d$ is formed a slot or groove $f$. (Indicated by dotted lines in Fig. 2 and forming part of a spiral.) In the bend $b$ are formed radial grooves $g$, in which are placed brackets $h$, the said brackets being mounted in the said grooves so as to be capable of being slid longitudinally therein. Each bracket $h$ is provided with a pin $i$, which projects into the slot or groove $f$ in the plate or sector $d$. The plate or sector $d$ is provided with teeth $d'$, into which gear the teeth of the wheel $n$, fast upon a shaft $n'$, carried by and capable of being rotated in a bearing formed upon the bend $b$. Fast upon the shaft $n'$ is a wheel $o$, into the teeth of which gears the worm $p$ on the axle $p'$, which is supported by and capable of being rotated in bearings formed upon the bend $b$. The flexible bend $j$ is mounted at its middle so as to be capable of being turned upon a stud $k$, projecting from one of the brackets $h$. This stud serves to prevent the flexible bend from being moved longitudinally. The two brackets at the opposite ends of the series of brackets are in sliding connection with the ends of the flexible bend, the said brackets being provided with pins or studs $m$, which pass into slots $j'$, formed in the ends of the flexible bend. The two brackets intermediate the middle bracket and the end brackets referred to are provided with pins or studs $l$, upon which the under side of the flexible bend rests at points between its middle and its ends, the said pins or studs affording radial support to the flexible bend at these points.

By applying a suitable key to the squared portion of the axle $p'$ of the worm $p$ the said worm may be rotated so as to move the cam plate or sector $d$ in the desired direction. As will be readily understood, movement of the cam plate or sector in one direction will adjust the brackets and flexible bend radially inward, and movement of the said cam plate or sector in the opposite direction will adjust the brackets and flexible bend radially outward, the movement of the cam plate or sector effecting positively the inward and outward adjustment of the brackets and the corresponding adjustments of the position and curvature of the bend.

When a carding-engine is being constructed, the surface of the flexible bend along or upon which the flats travel or rest is formed concentric with or so as to bear the required relations to the wire surface of the main cylinder. Whenever it may be necessary or desired, the said surface of the flexible bend may be adjusted to correspond with the wire surface of the main cylinder by means of the plate or sector $d$ and its operating devices.

Although I have shown five brackets $h$ as being employed in connection with the flexible bend, three or four, or a greater number, of such brackets $h$ may be employed under certain circumstances.

Although I have shown the cam plate or sector $d$ as being provided with an inclined groove or slot $f$, into which pass pins $i$, projecting from the brackets $h$, I would have it understood that the plate or sector may be provided with projecting pins and the brackets $h$ may be provided with inclined surfaces, against which the pins upon the plate or sector $d$ may act. In this case the inclined surfaces upon the brackets must be made of such length that the pins upon the plate or sector may be moved in contact with such inclined surfaces through the distance necessary, in order to effect the required adjustment of the flexible bend.

In some cases in order to enable the main cylinder to be adjusted into its true working position and in order to enable said main cylinder in case of wear to be restored to its correct working position I support the end of the axle $c$ of the main cylinder in a bracket $q$, which is secured to the bend $b$, by which it is carried by means of bolts $q'$ passing through slots formed through the said bracket. I also provide bracket $q$ with adjusting-screws $r$, capable of being screwed in screw-threads formed in the bracket $q$. The lower ends of the screws $r$ bear against flange $b^3$, formed upon the bend $b$. If at any time from wear or other cause the main cylinder has departed from its correct working position, the bolts $q'$ are slackened and the bracket $q$ is so adjusted by means of the screws $r$ as to again restore the main cylinder to its correct working position. By one of the screws $r$ being turned the said bracket $q$ may be tilted so as to move the axle $c$ of the main cylinder laterally, and by both of the screws $r$ being turned the axle may be raised or lowered. After the main cylinder has been adjusted into the required position the bracket $q$ is secured to the bend $b$ by the bolts $q'$ being tightened.

In some cases in order to enable the curve of the flexible bend $k$ to be radially adjusted relatively to the wire surface of the main cylinder I form one or more of the brackets as shown in Figs. 4, 5 and 6 and provide means such as is shown in the said figures for adjusting in the said bracket or brackets the stud or studs carried by the said bracket or brackets and engaging with the flexible bend. In the said figures I have shown a single bracket $h$, and the stud applied thereto is lettered $s$. This stud $s$ passes through the elongated slot $h'$, extending lengthwise of the bracket, the head or square portion $s'$ of the stud fitting in the said slot and a screw-thread being formed upon the outer portion of the stud for the reception of the nut $t$. A screw $u$ passes through the bracket $h$, the screw-threads upon the said screw taking into the screw-threads formed in the squared portion $s'$ of the stud $s$. The squared portion $s'$ of the stud prevents the latter from being turned in the slot $h'$, and the projecting end $s^2$ of the stud may pass into a hole or slot of the flexible bend. By turning the screw $u$ in the proper direction the stud $s$ may be caused to approach the axle $c$ of the main cylinder, or may be moved farther away from said axle. This enables me to vary, modify, and adjust the curve of the flexible bend in relation to the card-surface of the main cylinder without the plate or sector $d$ being moved.

I have shown in the drawings and have described herein only the devices which are applied to one side of the carding-engine; but it will be readily understood that in practice the devices which I have shown and which are herein described will be duplicated upon the side of the carding-engine which is opposite to the side now shown.

Having now particularly described and ascertained the nature of my invention and the manner of reducing the same to practice, I claim as my invention—

1. The combination, with the flexible bend of a traveling-flat carding-engine and radially-movable brackets connected with the flexible bend, of the cam-sector in operative engagement with the said brackets and serving to effect positively the inward and outward radial adjustment of the brackets and the corresponding adjustments of the position and curvature of the bend, substantially as described.

2. The combination, with the flexible bend of a traveling-flat carding-engine, a radially-movable bracket with which the middle of the flexible bend is connected, and radially-movable brackets having a sliding connection with the ends of the flexible bend, of radially-movable supporting-brackets carrying pins for sustaining the portions of the flexible bend intermediate its middle and ends, and devices for adjusting simultaneously all of said brackets radially, substantially as described.

3. The combination, with the flexible bend of a traveling-flat carding-engine, a radially-movable bracket, and devices for adjusting said bracket radially on the frame of the carding-engine, of a stud for connecting the bend with the bracket, and devices acting on the stud to effect a radial adjustment of the bend relatively to the bracket, substantially as described.

4. The combination, with the flexible bend of a traveling-flat carding-engine, a radially-movable bracket, and devices for adjusting said bracket radially on the frame of the carding-engine, of a stud for connecting the bend with the bracket, and a screw for adjusting the stud radially upon the bracket, substantially as described.

In testimony whereof I have hereunto set my hand, in the presence of two witnesses, this 8th day of June, 1891.

THOMAS S. WHITWORTH.

Witnesses:
H. B. BARLOW,
HERBERT R. ABBEY.